(12) United States Patent
Malik (10) Patent No.: US 7,580,984 B2
(45) Date of Patent: Aug. 25, 2009

(54) SYSTEM AND METHOD FOR SORTING E-MAIL

(75) Inventor: Dale W. Malik, Dunwoody, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 193 days.

(21) Appl. No.: 11/554,459

(22) Filed: Oct. 30, 2006

(65) Prior Publication Data

US 2008/0120379 A1 May 22, 2008

Related U.S. Application Data

(63) Continuation of application No. 09/888,718, filed on Jun. 25, 2001, now Pat. No. 7,133,898.

(51) Int. Cl.
G06F 15/16 (2006.01)
G06F 15/173 (2006.01)

(52) U.S. Cl. .................. 709/206; 709/224; 709/225; 709/232; 709/239

(58) Field of Classification Search .............. 709/201, 709/203, 206, 207, 225, 238, 245; 707/10; 705/401
See application file for complete search history.

(56) References Cited

U.S. PATENT DOCUMENTS

| | | | |
|---|---|---|---|
| 5,961,590 A | 10/1999 | Mendez | |
| 5,978,837 A | 11/1999 | Foladere et al. | |
| 5,999,932 A * | 12/1999 | Paul | 709/206 |
| 6,023,723 A * | 2/2000 | McCormick et al. | 709/206 |
| 6,047,310 A * | 4/2000 | Kamakura et al. | 709/201 |
| 6,088,696 A * | 7/2000 | Moon et al. | 707/10 |
| 6,216,165 B1 | 4/2001 | Woltz | |
| 6,266,692 B1 * | 7/2001 | Greenstein | 709/206 |
| 6,292,211 B1 | 9/2001 | Pena | |
| 6,421,709 B1 | 7/2002 | McCormick | |
| 6,453,327 B1 | 9/2002 | Nielsen | |
| 6,499,021 B1 | 12/2002 | Abu-Hakima | |
| 6,507,866 B1 * | 1/2003 | Barchi | 709/225 |
| 6,574,658 B1 | 6/2003 | Gabber et al. | |
| 6,643,687 B1 * | 11/2003 | Dickie et al. | 709/238 |
| 6,654,787 B1 * | 11/2003 | Aronson et al. | 709/206 |
| 6,691,156 B1 * | 2/2004 | Drummond et al. | 709/203 |
| 6,708,205 B2 | 3/2004 | Sheldon | |
| 6,772,196 B1 * | 8/2004 | Kirsch et al. | 709/206 |
| 6,779,021 B1 * | 8/2004 | Bates et al. | 709/245 |
| 6,938,021 B2 | 8/2005 | Shear | |
| 6,957,259 B1 | 10/2005 | Malik | |
| 7,085,745 B2 * | 8/2006 | Klug | 705/401 |

(Continued)

OTHER PUBLICATIONS

U.S. Appl. No. 09/888,719, filed Jun. 25, 2001.

(Continued)

*Primary Examiner*—Quang N. Nguyen (57) ABSTRACT

A system for intelligently sorting e-mail comprises a client which downloads e-mails from a server. Prior to presenting the e-mails to the user, the client sorts the e-mail into classifications based upon whether the e-mail is from a personal contact, i.e. someone that that the user knows, whether the e-mail is from a commercial vendor from whom the user has indicated that he or she wishes to accept commercial e-mail, or whether the e-mail is from an unknown source. The client presents the e-mails to the user in these classifications.

9 Claims, 8 Drawing Sheets

U.S. PATENT DOCUMENTS

| | | |
|---|---|---|
| 7,133,898 B1 | 11/2006 | Malik |
| 7,143,089 B2 | 11/2006 | Petras |
| 7,177,909 B2 | 2/2007 | Stark |
| 7,277,919 B1 | 10/2007 | Donoho |
| 2001/0023432 A1 | 9/2001 | Council |
| 2001/0027474 A1 | 10/2001 | Nachman |
| 2001/0049745 A1 | 12/2001 | Schoeffler |
| 2002/0021675 A1 | 2/2002 | Feldmann |
| 2002/0026484 A1 | 2/2002 | Smith |
| 2002/0049806 A1 | 4/2002 | Gatz |
| 2002/0052855 A1 | 5/2002 | Landesmann |
| 2002/0091777 A1 | 7/2002 | Schwartz |
| 2002/0116641 A1 | 8/2002 | Mastrianni |
| 2002/0120702 A1* | 8/2002 | Schiavone et al. .......... 709/207 |
| 2002/0198950 A1 | 12/2002 | Leeds |
| 2003/0009526 A1 | 1/2003 | Bellegarda |
| 2008/0120379 A1 | 5/2008 | Malik |

OTHER PUBLICATIONS

U.S. Appl. No. 11/190,326, filed Jul. 27, 2005.
U.S. Appl. No. 12/022,648, filed Jan. 30, 2008.
U.S. Appl. No. 09/888,718, filed Jun. 25, 2001.
U.S. Appl. No. 11/020,369, filed Dec. 24, 2004.
Office Action dated May 14, 2008; U.S. Appl. No. 11/020,369, filed Dec. 22, 2004.
Office Action dated Dec. 19, 2008; U.S. Appl. No. 11/020,369, filed Dec. 22, 2004.

* cited by examiner

SYSTEM AND METHOD FOR SORTING E-MAIL

RELATED APPLICATIONS

The present application is a continuation of U.S. patent application Ser. No. 09/888,718, now U.S. Pat. No. 7,133,898, filed on Jun. 25, 2001, and entitled "System and Method for Sorting E-Mail Using a Vendor Registration Code and a Vendor Registration Purpose Code Previously Assigned by a Recipient," the disclosure of which is hereby incorporated herein, in its entirety, by reference.

FIELD OF THE INVENTION

The present invention relates generally to electronic mail ("e-mail") server systems, and more particularly, to systems and methods for intelligently sorting Internet e-mail.

BACKGROUND OF THE INVENTION

Over the past fifteen years, the use of e-mail has experienced tremendous growth. People regularly send and receive e-mails at all times of the day from work, from home, and even from e-mail enabled mobile devices. Indeed, for many people, e-mail has become a primary means of communication.

While e-mail is a great technology and has enhanced communication in our society, it does not come without cost. As an example, e-mail users spend significant amounts of time reviewing and replying to the numerous e-mails that they receive daily. This task has been made more cumbersome and time consuming by the large quantities of junk e-mail, or SPAM, which continuously flow into e-mail in-boxes. E-mail users must sort through all of the SPAM in order to get to the e-mail that they desire to see.

Applicant has recognized that there is a need in the art for systems and methods for automatically sorting e-mail so that a user can more quickly access the e-mails that he or she wishes to review. More specifically, Applicant has recognized the need in the art for systems and methods that automatically sort e-mail into classifications based upon whether the e-mail is from a personal contact, i.e. someone that that the user knows, whether the e-mail is from a commercial vendor from whom the user has indicated that he or she wishes to accept commercial e-mail, or whether the e-mail is from an unknown source. A system with these features would allow users to disregard junk e-mail and go directly to the e-mail in which he or she is interested.

SUMMARY OF THE INVENTION

Briefly, the present invention meets these and other needs in the art.

Generally, the invention relates to systems and methods for intelligently sorting e-mail. In an embodiment of the invention, the system comprises an e-mail server and e-mail client for sending and receiving e-mail. E-mail is received at the e-mail server and periodically downloaded upon request from the e-mail client. Prior to presenting the e-mails to the user, the client sorts the e-mail into classifications based upon whether the e-mail is from a personal contact, i.e. someone that that the user knows, whether the e-mail is from a commercial vendor that has registered to send e-mail to the user, or whether the e-mail is from an unknown source. With e-mail sorted in this manner, it is much easier for the user to locate the e-mail that he or she desires to review.

According to an aspect of the invention, providers of e-mail may be registered to forward e-mail to users. The registration may be a generic automated process or an individualized process by which users specify the particulars of registration for each web site. E-mail received from registered sources is sorted and presented separately from commercial e-mail that is not registered. For example, the web site www.usair.com may become registered to send e-mails to a user. During the registration process, the web site is assigned a vendor registration code. Accordingly, when an e-mail is forwarded from the site www.usair.com, it should include the vendor registration code. The e-mail client recognizes the code and presents the e-mail from www.usair.com so as to be distinguished from other commercial e-mail that does not contain a registration code. Thus, the commercial mail that the user wishes to see is separated from all of the unregistered SPAM that typically clutters his or her mailbox.

According to a further aspect of the invention, even for those e-mail sources or web sites that have been "registered" to send e-mail to a user, only specific types of e-mail may be authorized. For example, a user may authorize receiving special promotions or bills from a commercial site but may not want to receive general commercial advertising. Each specific type of mail has a vendor registration product code assigned thereto. When a user authorizes receiving a specific type of mail from a vendor, the vendor registration product code is stored for future reference by the client and forwarded to the vendor. When e-mail is sorted for presentation to the user, e-mails having the appropriate vendor registration code and vendor registration product code are presented separate from other e-mails from the same vendor that do not have the authorized vendor registration product code. For example, a user may authorize receiving e-mails regarding special fares from the web site www.usair.com. E-mails received from www.usair.com that have the vendors registration product code and which presumably relate to special air fares are presented separately from other e-mails from www.usair.com that relate to issues such as, for example, general advertising.

E-mails are also sorted based upon whether they are received from personal contacts of the user. Many e-mail clients provide a form of electronic rolodex in which users can save contact information such as names, telephone numbers, and addresses. One of the pieces of information that is often maintained by e-mail clients is the e-mail address of a contact. Using the contact email address information, it is possible to classify emails that are received from existing contacts. Accordingly, when an e-mail is received, it is discerned whether the e-mail address of the sender is that of a person in the user's electronic contacts list or rolodex. If so, the e-mail is presented to the user along with other e-mails that have similarly been received from persons in the user's contact list. For example, a may have John Doe from Trenton, N.J. in his e-mail contacts list. The contact information may indicate that John Doe's e-mail address is jdoe@aol.com. When an e-mail is received having the e-mail address jdoe@aol.com, the e-mail client recognizes it as having been received from a contact and presents the e-mail to the user along with others that have been received from persons in the user's contacts list.

E-mails that are not from either a contact or from a registered vendor are grouped together based upon the type of web site from which the e-mail was forwarded. In a related patent application entitled "System and Method for Regulating E-mail," filed on the same date as the present application, the contents of which are hereby incorporated by reference in their entirety, a database is disclosed which comprises a list of categories of sources from which e-mail might be received.

These categories are referred to herein as "e-mail source categories." Typical e-mail source categories might include, for example, the following: large ISP—designating ISP's servicing a large number of users; medium ISP—designating ISP's servicing a medium number of users; small ISP—designating ISP's servicing a small number of users; *gov—designating sources in the .gov domain; .edu—designating sources in the .edu domain; and .com—designating sources in the .com domain. These categories of e-mail sources are periodically downloaded from servers 110, 112, and 114 to clients 118. For e-mails that are not either from a contact or from a registered vendor, the e-mail client identifies from which of the source categories the e-mail was received. E-mails from the same source category are grouped together when presented to the user. For example, if an e-mail is received from smith@promotions.com and smith@promotions.com is neither listed in the user's contacts list nor a registered vendor, the e-mail is presented with other e-mails from unknown persons originating from the same source category, which might be, for example the ".com" source category. Thus, all of the e-mails from unknown or unregistered persons at the ".com" source category are grouped together and all of the e-mails from unknown or unregistered persons at the ".net" source category are similarly grouped together.

Using the filtering capabilities of the inventive system, a user or postmaster may identify that only unwanted mail is being received from a particular source. For example, it may become clear that only unwanted SPAM is being received from the source. Accordingly, a user may block e-mail from the source. Thus, when an e-mail is received from a source that has been blocked, a reply e-mail is sent to the source along with an indication that e-mails are no longer being accepted. The reply e-mail may also provide information on whom to contact in case there has been a mistake in the decision to block e-mail.

Accordingly, users of systems and methods in accordance with the invention are presented with e-mails that have been presorted. Specifically, e-mail is presented to the user sorted into classifications based upon whether the e-mail is from a personal contact, i.e. someone that that the user knows, whether the e-mail is from a commercial vendor from whom the user has indicated that he or she wishes to accept commercial e-mail, or whether the e-mail is from an unknown source.

Additional aspects of the invention are described in detail below.

BRIEF DESCRIPTION OF THE DRAWINGS

Other features of the invention will be further apparent from the following detailed description of presently preferred exemplary embodiments of the invention taken in conjunction with the accompanying drawings, of which.

DETAILED DESCRIPTION OF THE INVENTION

A system and method with the above-mentioned beneficial features in accordance with a presently preferred exemplary embodiment of the invention will be described below with reference to FIGS. 1-7. It will be appreciated by those of ordinary skill in the art that the description given herein with respect to those figures is for exemplary purposes only and is not intended in any way to limit the scope of the invention. All questions regarding the scope of the invention may be resolved by referring to the appended claims.

The invention relates to systems and methods for intelligently sorting e-mail. Client e-mail software sorts the e-mail into classifications based upon whether the e-mail is from a personal contact, i.e. someone that that the user knows, whether the e-mail is from a commercial vendor from whom the user has indicated that he or she wishes to accept commercial e-mail, or whether the e-mail is from an unknown source.

Figure 1:
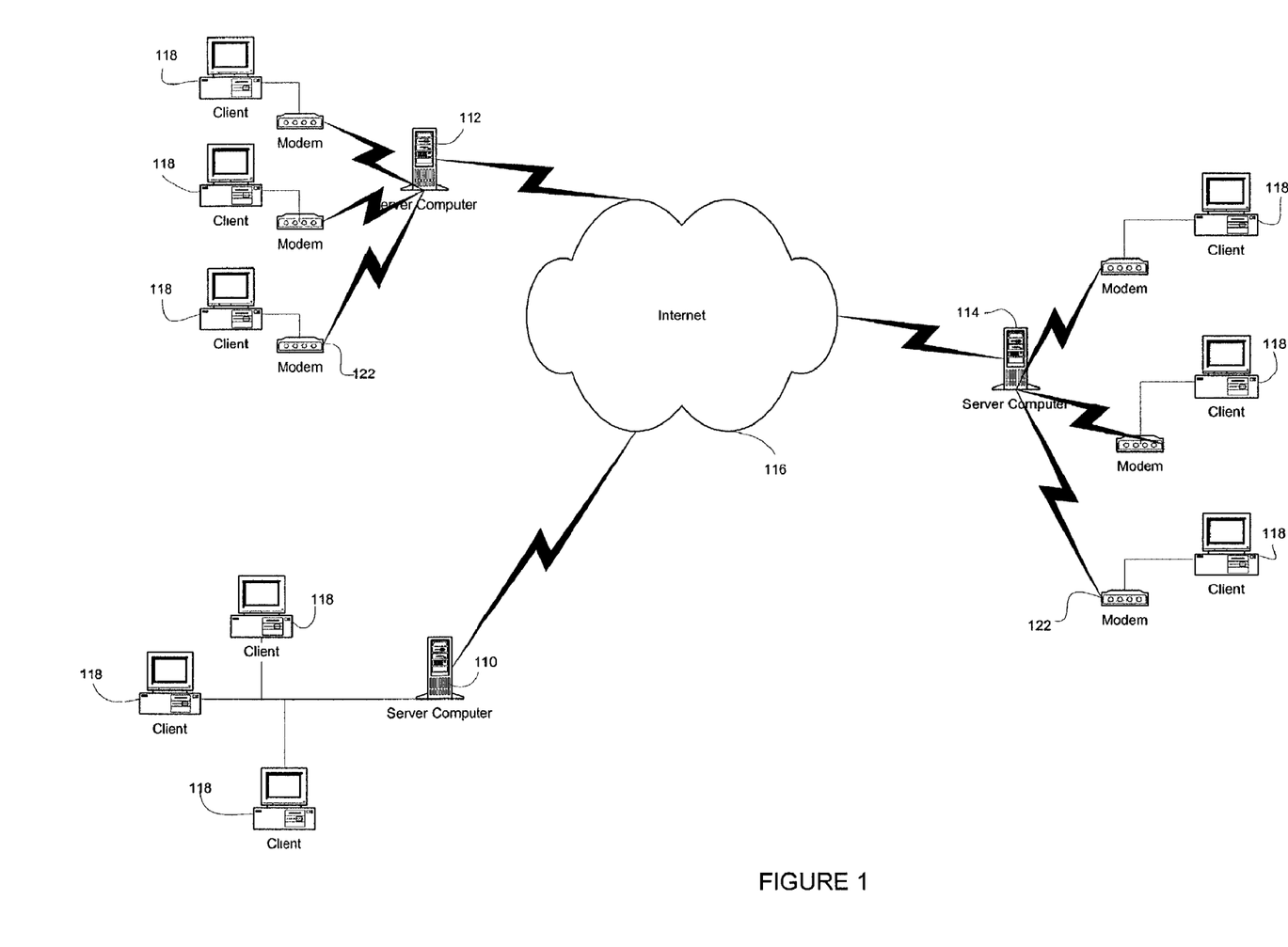
FIG. 1 is a high level diagram of a network for transmitting e-mail.

FIG. 1 is a high level diagram of an exemplary computer network for communicating e-mail. As shown, three e-mail servers 110, 112, and 114 are operable to communicate with one another over network 116, which may be for example, the Internet. E-mail servers 110, 112, and 114 may communicate e-mails but also may communicate web pages as well. E-mail servers 110, 112, and 114 may be operated by an ISP, a corporate computer department, or any other organization with a mail server connected to Internet 116. Each of mail servers 110, 112, and 114 are accessible by client stations 118 from which users send and receive e-mails and browse web pages. Client stations 118 may connect to mail servers via a local area network (LAN) 120, as shown in relation to server 110, or using a remote connection device 122 such as, for example, a modem, as is shown in connection with servers 112 and 114.

In the system of FIG. 1, e-mails are composed at client stations 118 and forwarded to one of e-mail servers 110, 112, and 114. E-mail severs 110, 112, and 114 communicate the e-mails over Internet 116 using SMTP and POP protocols. The e-mails are ultimately delivered at one of e-mail servers 110, 112, and 114. Client stations 118 use client e-mail software to access the e-mail from the servers.

E-mail servers 110, 112, and 114 comprise e-mail mail server software. Specifically, servers 110, 112, and 114 comprise simple mail transfer protocol (SMTP) and post office protocol (POP) software for receiving and routing e-mail. Those skilled in the art will recognize that while servers 110, 112, and 114 are depicted using a single machine in FIG. 1, the servers may comprise a plurality of computing machines, i.e. more than a single server machine may be employed to provide the functionality described herein as being provided by the server.

Client stations us comprise e-mail client software for communicating with e-mail servers 110, 112, and 114. Client stations 118 may further comprise web browser software for browsing web pages. Those skilled is in the art will recognize that while client stations 118 are depicted as desk top computers, virtually any type of computing machine such as, for example, a PDA, a cell phone, or a lap top computer are suitable as an e-mail client.

Figure 2:
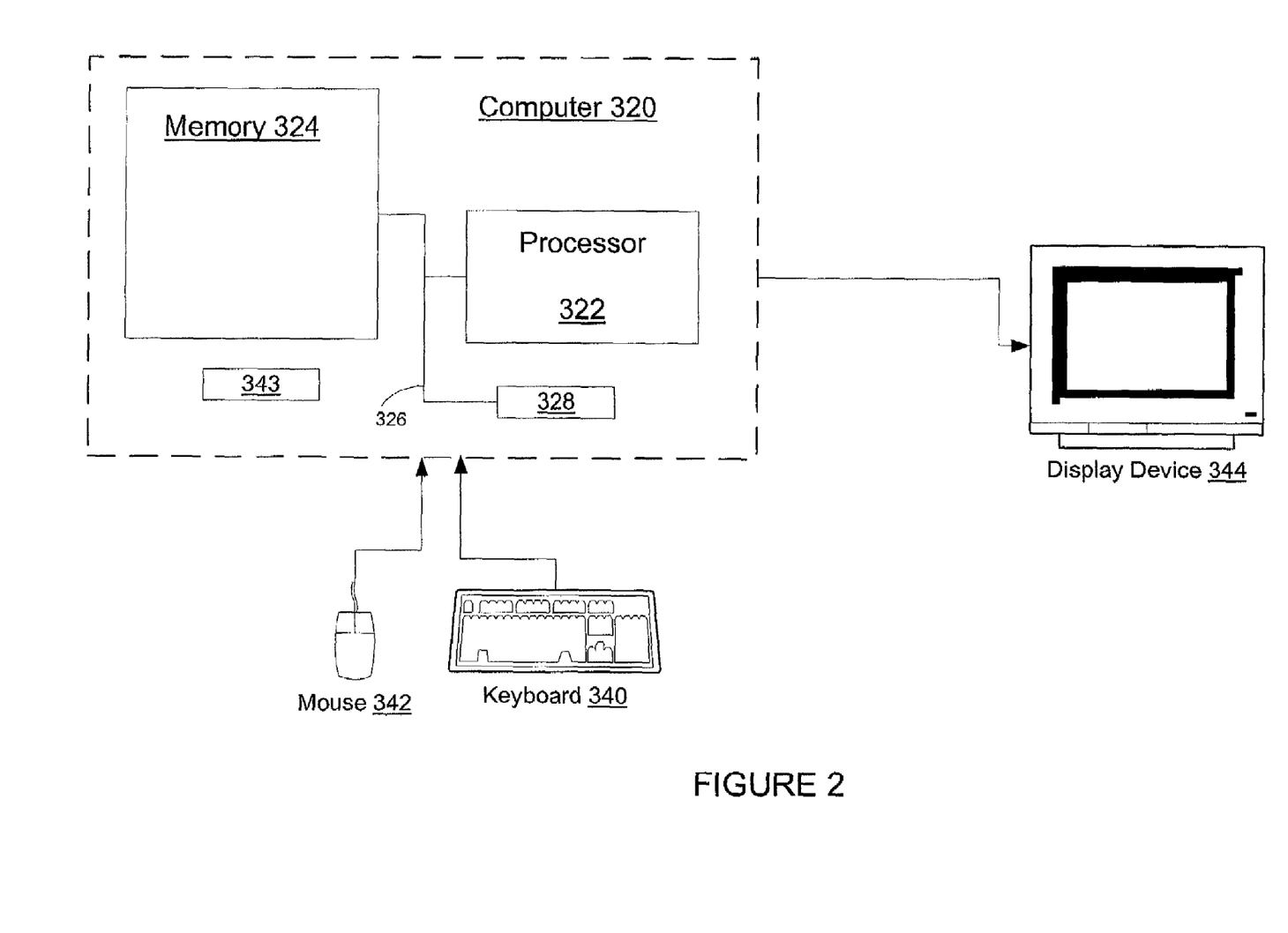
FIG. 2 is a block diagram of a computing system suitable for use in an embodiment of the present invention.

E-mail servers 110, 112, and 114 as well as client stations 118 are generic computing systems. FIG. 2 is a block diagram of a generic computing system suitable for use in a system in accordance with the present invention. As shown, computing device 320 includes processing unit 322, system memory 324, and system bus 326 that couples various system components including system memory 324 to the processing unit 322. The system memory 324 might include read-only memory (ROM) and random access memory (RAM). The system might further include hard-drive 328, which provides storage for computer readable instructions, data structures, program modules and other data. A user may enter commands and information into the computer 320 through input devices such as a keyboard 340 and pointing device 342. A monitor 344 or other type of display device is also connected to the system for output. Communications device 343, which in one embodiment may be a modem, provides for communications over network 102. Processor 322 can be programmed with instructions to interact with other computing systems so as to perform the algorithms described below with reference to FIGS. 6 and 7. The instructions may be received from network 102 or stored 20 in memory 324 and/or hard drive 328. Processor 322 may be loaded with any one of several computer operating systems such as Windows NT, Windows 2000, or Linux.

Figure 3:
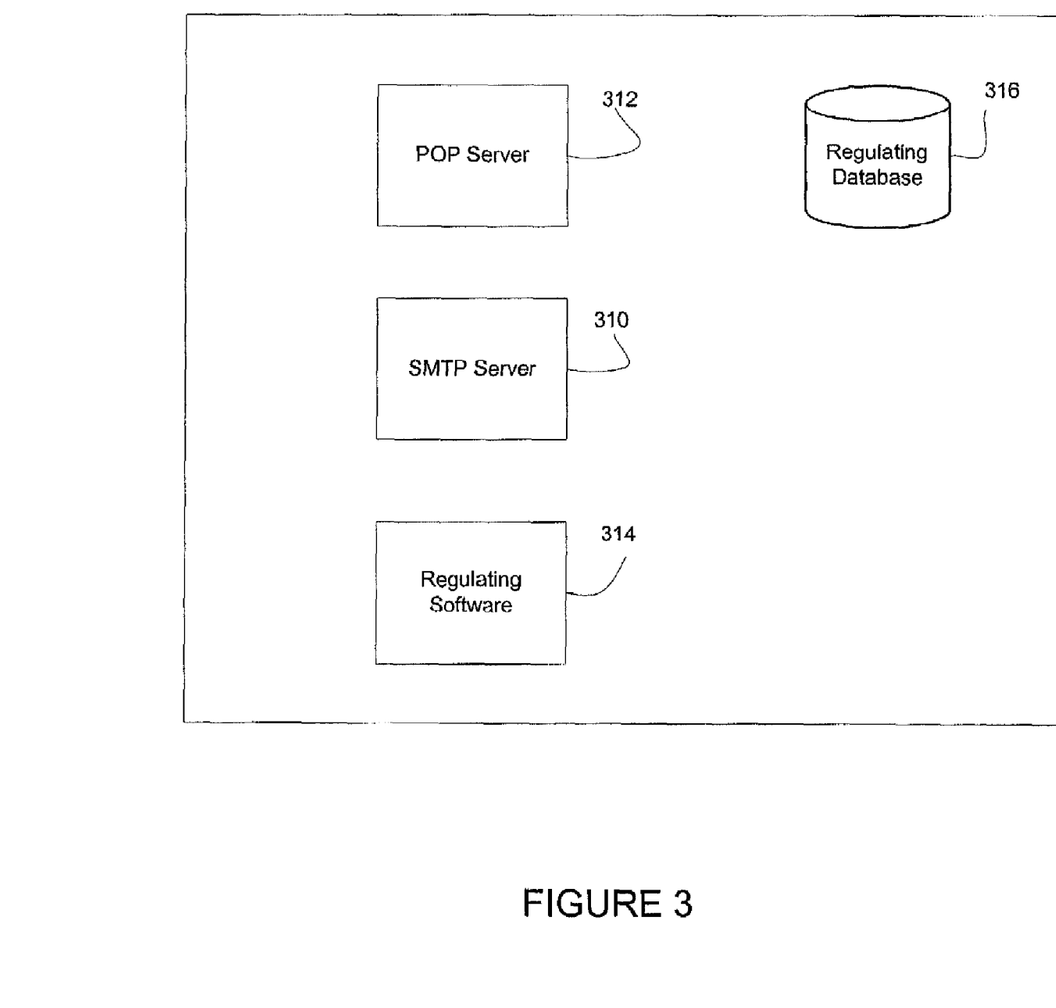
FIG. 3 is a diagram illustrating the functional components of a server computer or cluster of server computers for use in an embodiment of the present invention.

FIG. 3 is a diagram of the software components of e-mail servers 110, 112, and 114. As shown, servers 110, 112, and 114 comprise SMTP server software 310, POP server software 312, regulating software 314, and database 316. SMTP server software 310 operates according to known methods to route outgoing emails. POP server software 312 operated to route incoming e-mails according to known methods. Regulating software 314 operates as described in related patent application entitled "System and Method for Regulating Software" to regulate e-mail flowing between servers. Regulating database software 316 implements the data structure described below with reference to FIG. 4 and is used to store the data used by regulating software 314.

Figure 4:
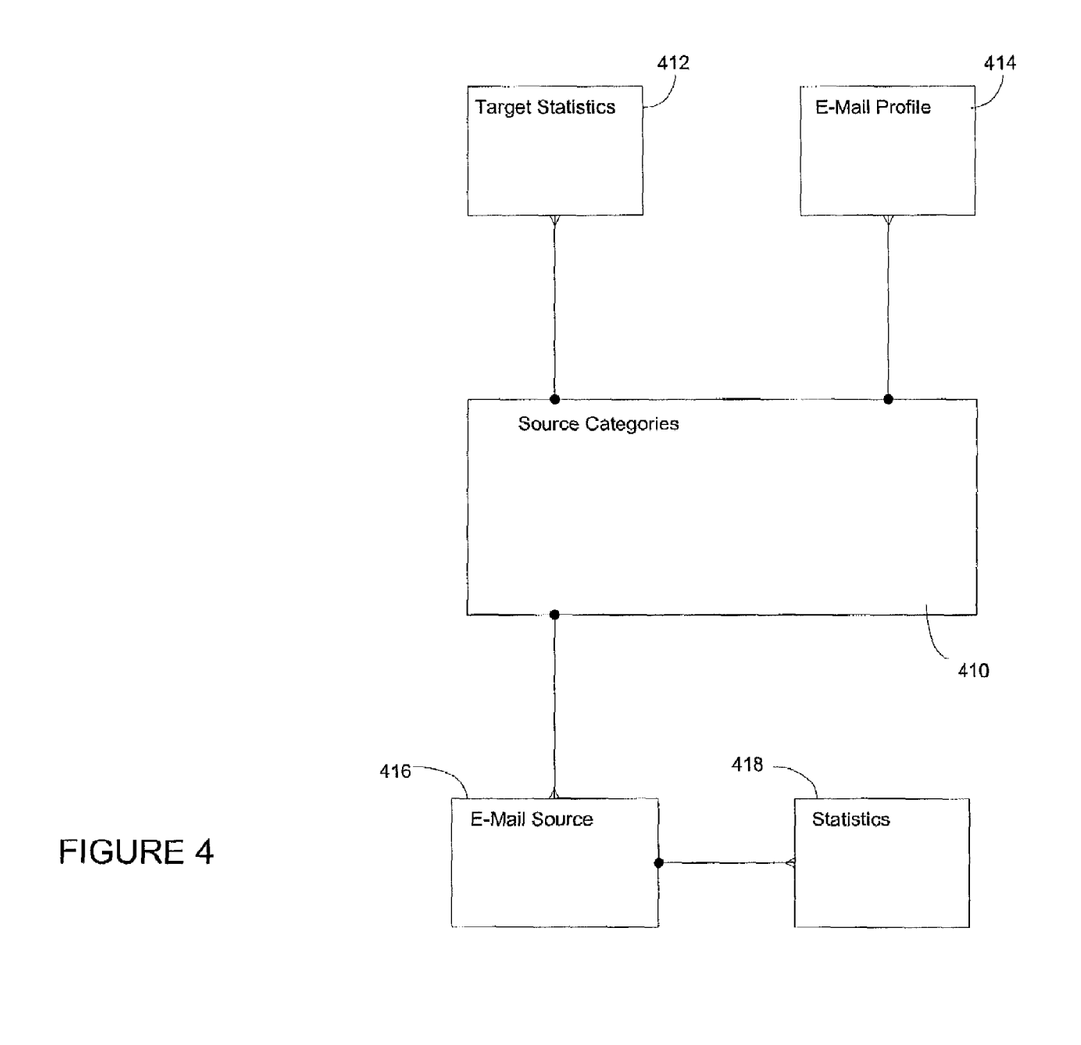
FIG. 4 is a diagram representing data entities stored in a database system in accordance with an embodiment of the present invention.

FIG. 4 is a diagram depicting various entities and relationships established in database 316. As shown, a database, which may be maintained by server 110, 112, or 114, has stored therein data representing source categories 410. The source categories 410 represent a list of categories of sources from which e-mail may be received. These categories are referred to herein as "e-mail source categories." Typical e-mail source categories might include, for example, the following: large ISP—designating ISP's servicing a large number of users; medium ISP—designating ISP's servicing a medium number of users; small ISP—designating ISP's servicing a small number of users; *gov—designating sources in the .gov domain; *edu—designating sources in the *edu domain; and *com—designating sources in the *com domain. Of course, other e-mail source categories may be used depending upon the type of e-mail which it is desired to regulate.

As shown, a plurality of e-mail sources 416 may be associated with any one source category 410. For example, the ".com" source category may have a plurality of e-mail sources associated therewith. Thus, sources such as, for example, bellsouth.com and hotmail.com may is be related to the ".com" source category. Portions of database 316, specifically the source categories, may be periodically downloaded to client stations 118. This information is employed by the client stations 118 as described below to sort e-mail that is neither from a contact nor from a registered web site.

Figure 5:
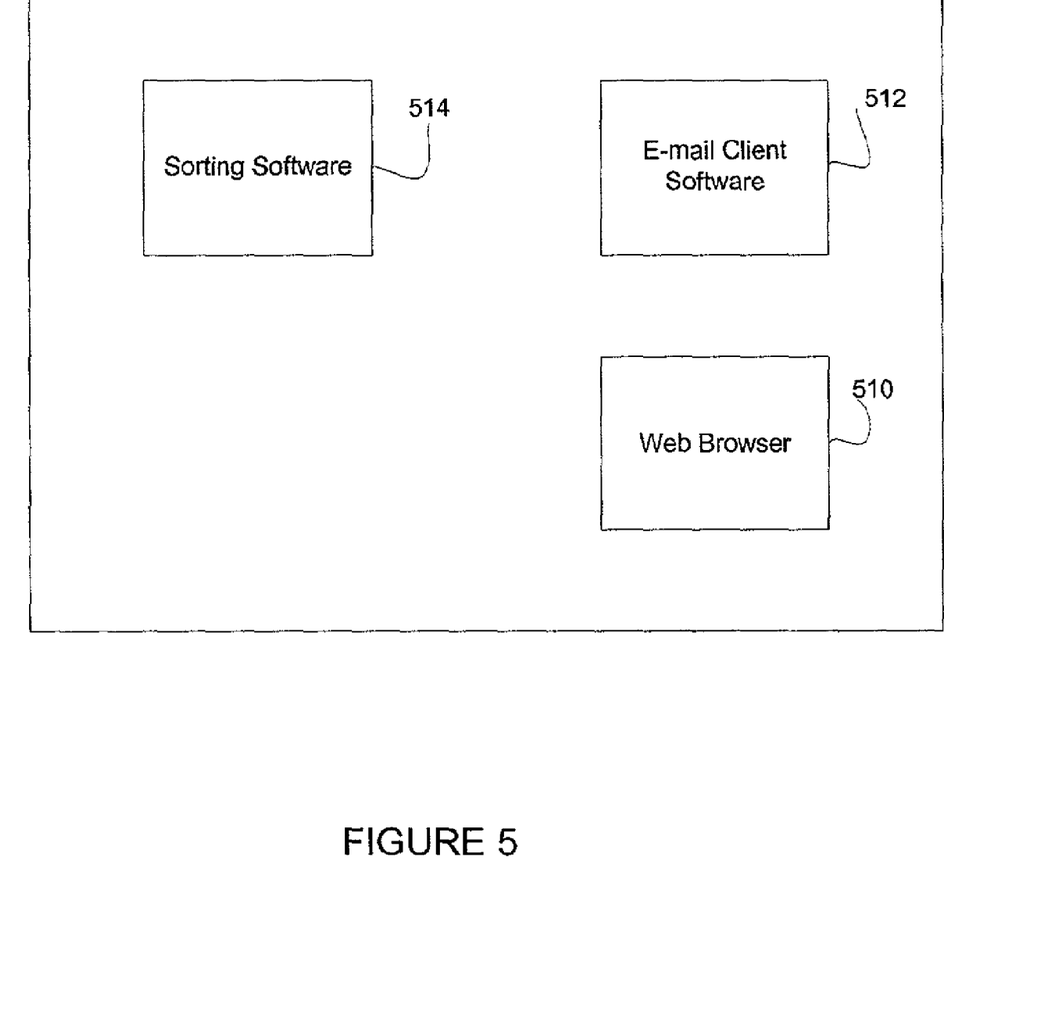
FIG. 5 is a diagram illustrating the functional components of a client computer for use in an embodiment of the present invention.

FIG. 5 is a diagram of the functional software components of client stations 118. As shown, client stations 118 may comprise web browser software 510, e-mail client software 512, and sorting software 514. Web browser software 510 allows client stations 118 to access web pages over network 110. Web browser software 510 may be any one of several well-known web browsers such as, for example, Microsoft Internet Explorer or Netscape Navigator. E-mail client software 512 allows clients to access e-mails from servers 110, 112, and 114 and present the e-mails to a user. E-mail client software might be any of several well-known e-mail clients such as, for example, Microsoft Outlook or Qualcomm's Eudora. Sorting software 514 sorts the e-mail into classifications based upon whether the e-mail is from a personal contact, i.e. someone that that the user is knows, whether the e-mail is from a commercial vendor from whom the user has indicated that he or she wishes to accept commercial e-mail, or whether the e-mail is from an unknown source. Further details regarding the operation of sorting software 514 are provided below in connection with the description of FIGS. 6 and 7. Those skilled in the art will recognize that while sorting software 514 is depicted separate from e-mail client software 516, it might be integrated with client software 516.

According to an aspect of the invention, sources of commercial e-mails are registered to forward e-mail to a user. The registration may be a generic automated process or an individualized process by which users specify the particulars of registration for each web site. E-mail received from registered sources is sorted and presented separately from commercial e-mail that is not registered.

Figure 6:
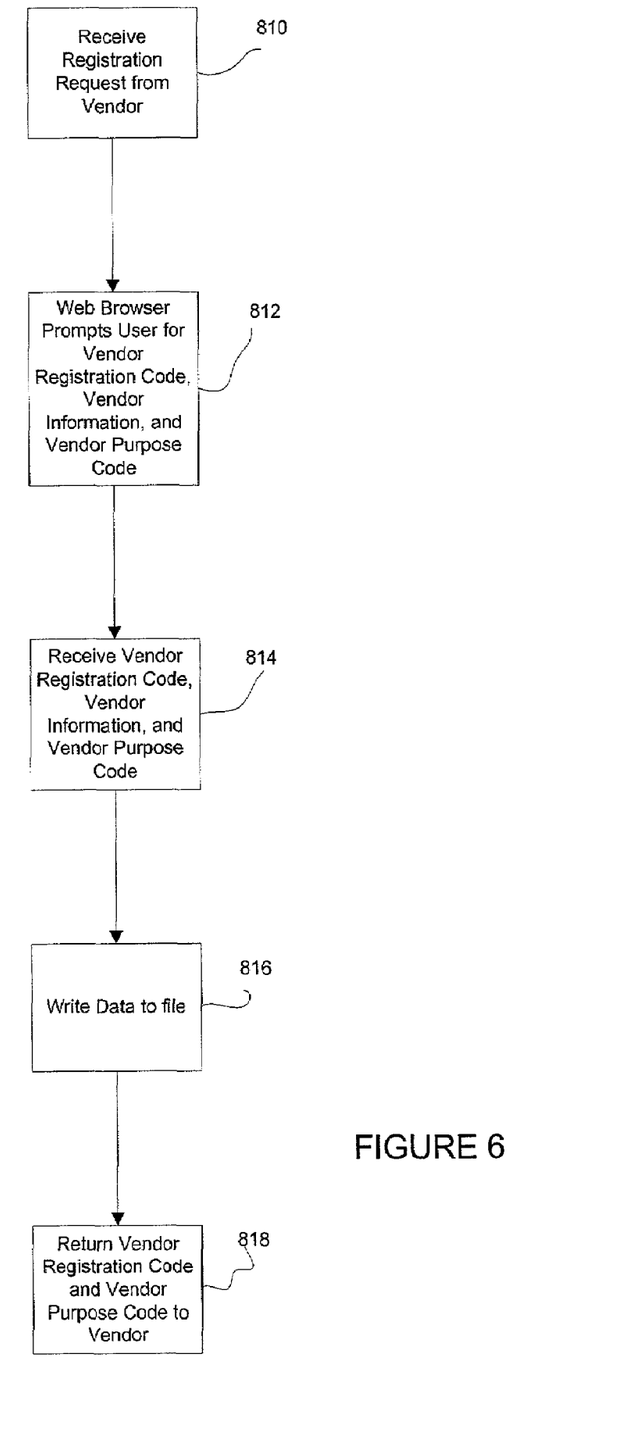
FIG. 6 is a flow diagram of a method for registering web sites for sending e-mail.

FIG. 6 is a flowchart of an individualized process for authorizing or registering e-mail sources to send e-mail to a client. In one embodiment, this method is implemented by a web browser that has been programmed to perform the recited steps. As shown, at step 610 a request is received at a web browser to register a particular e-mail source, which is typically a web page. At step 612, the web browser prompts the user for a vendor registration code, vendor information, and vendor registration contact purpose. The vendor registration code is a string of characters used to identify e-mail from the particular e-mail source. In one embodiment, vendor registration codes are defined by the user. In an alternative embodiment, however, they might be defined automatically by the client computer. Vendor information is simply data about the vendor and might include information about the vendor such as, for example, the name of the vendor. Vendor registration purpose codes identify the purpose for which the user authorizes to receive e-mail. For example, there may be three classes of e-mail purposes—promotions; billing; and general advertising. The user identifies which of these he or to she wishes to receive. A user may specify more than one vendor purpose code.

At step 614, the user indicates his or her choices for vendor registration code, vendor information, and vendor purpose codes. At step 616, the client 118 writes the vendor information to storage and at step 618, forwards a copy of the vendor registration code and vendor purpose codes to the source.

In an alternate embodiment of the inventive system, registration of e-mail sources takes place via a 20 generic automated process. In this alternate embodiment, rather than the user specifying registration information including the vendor registration code, vendor information and vendor purpose code, for each e-mail source, these items are automatically assigned to an e-mail source. Furthermore, according to this alternate embodiment, the registration process may be initiated by the e-mail sources rather than the users. Accordingly, an e-mail source may unilaterally request to register to send e-mail and automatically assign a vendor registration code and vendor purpose codes without user intervention.

Figure 7:
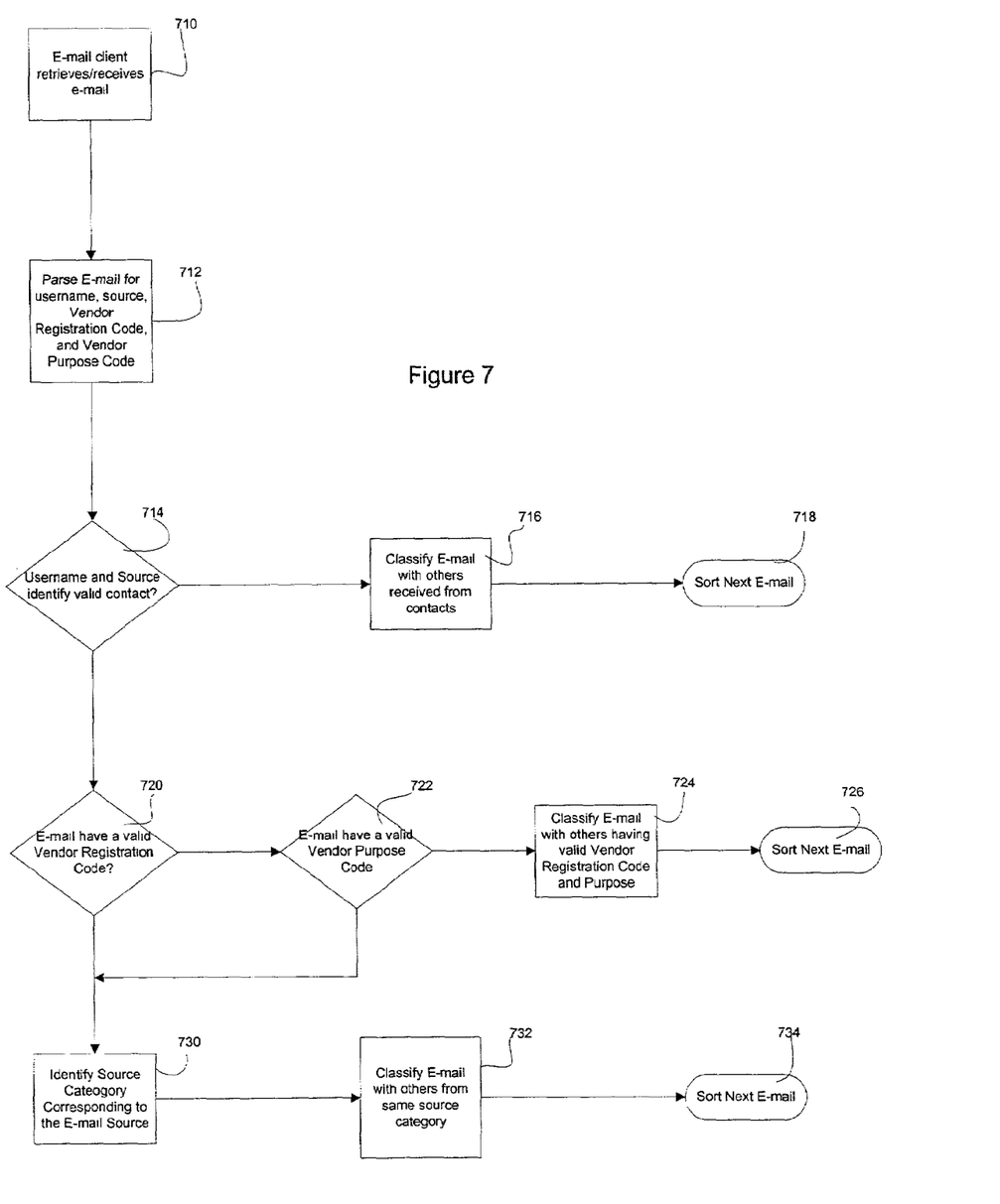
FIG. 7 is a flow diagram of a method for sorting e-mails.

Using vendor registration information that has been collected, a system in accordance with the present invention is operable to sort incoming e-mails as shown in FIG. 7. At step 710, the e-mail client 118 reads an e-mail. At step 712, the e-mail is parsed so as to identify the following: the username of the sender, the source of the e-mail, the vendor registration code, and the vendor purpose code. At step 714, it is determined whether the username and source identify a contact of the particular user. This is determined by comparing the username and source to the information in the user's electronics contact list or rolodex. If at step 714, the username and source identify a valid contact, at step 716 the e-mail is classified, usually by making a notation in the appropriate file, for presentation to the user along with other e-mails that are received from personal contacts. At step 718, the next e-mail is sorted.

If the e-mail was not from a contact of the user, at step 720, it is determined whether the e-mail has a valid registration code. Typically this is performed by comparing the vendor registration code of the e-mail, if it in fact has one, with the list of valid vendor registration codes maintained by the client 118. If the e-mail has a valid vendor registration code, at step 722, it is determined whether the e-mail has a vendor purpose code corresponding to any that may have been selected by the user for the particular vendor. This determination is made by comparing the vendor purpose code from the e-mail, if any, with the vendor purpose codes that were saved during the registration process explained above in connection with FIG. 6. If the vendor registration code and vendor purpose code match those provided during registration, at step 724, the e-mail is classified, usually by making a notation in the appropriate file, for presentation to the user along with other e-mails that are received from vendors to which permission has been given to forward c-mails to the particular user. At step 726, the next e-mail is sorted.

If the e-mail was received from neither a valid contact nor a valid source, at step 730 the source category corresponding to the e-mail source is identified. At step 732, the e-mail is classified, usually by making a notation in the appropriate file, for presentation with other e-mails received from the same source category.

Figure 8:
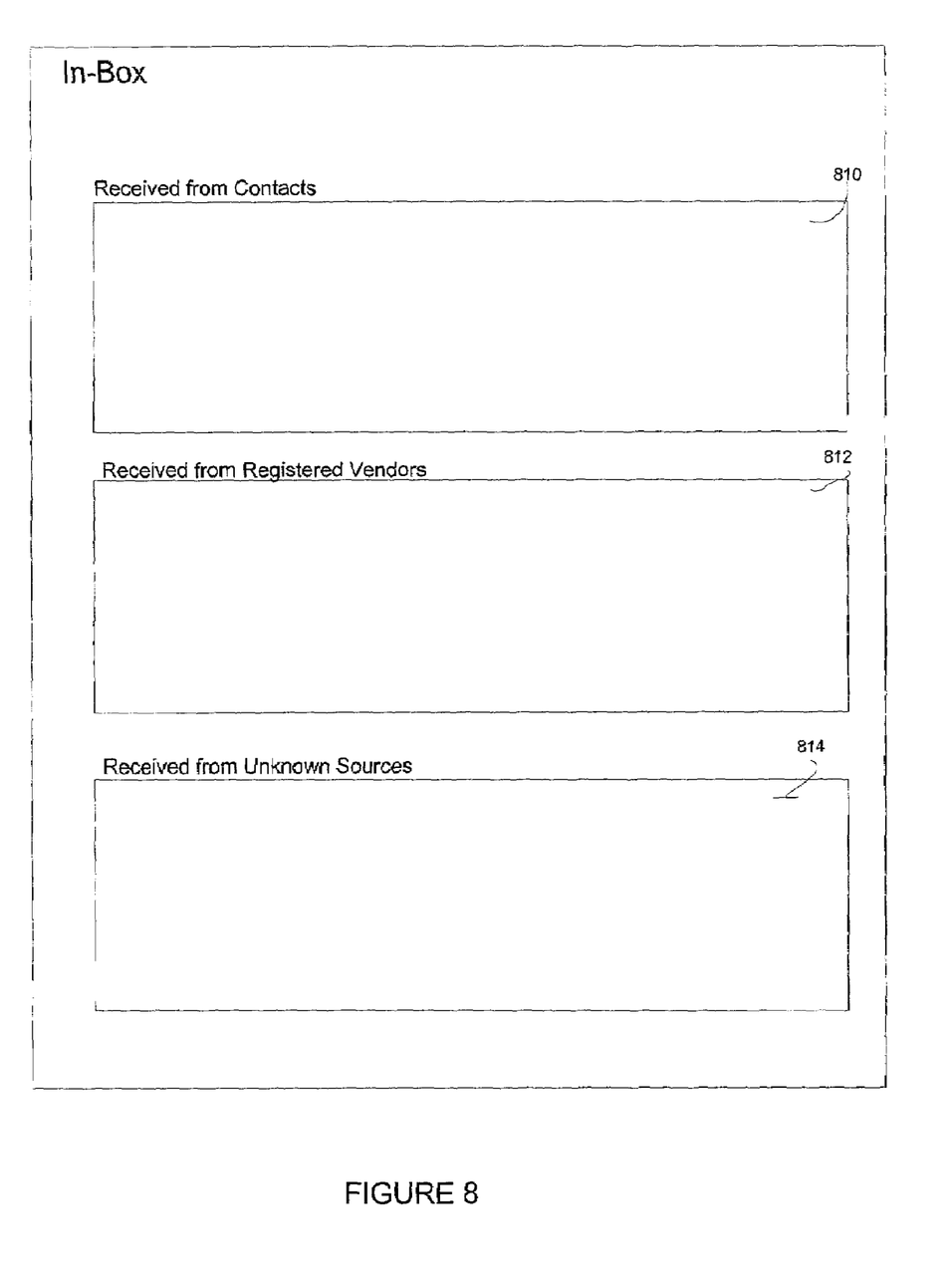
FIG. 8 shows an exemplary user interface for displaying sorted emails.

FIG. 8 provides a diagram of an exemplar user interface for displaying sorted e-mails in accordance with an aspect of the invention. As shown, the screen comprises a first section 810 for displaying a list of e-mails received from the user's contacts. The exemplary screen further comprises a second section 812 for displaying a list of e-mails from vendors that have previously registered to forward e-mails to the user. Finally, the exemplary screen comprises a third section 814 for displaying e-mails that are neither from the user's contacts nor from a registered vendor. E-mails in third section 814 are grouped together by the source category from which they were received.

Using the filtering capabilities of the inventive system, a user or postmaster may identify that only unwanted mail is being received from a particular source. For example, it may become clear that only unwanted SPAM is being received from a particular web site. Accordingly, a user may elect to block e-mail from the source. Thus, when an e-mail is received from a source that has been blocked, a reply e-mail is sent to the source along with an indication that e-mails are no longer being accepted. The reply e-mail may also provide information on whom to contact in case there has been a mistake in the decision to block e-mail. For example, the reply e-mail may indicate that an e-mail with the word "help" in the header ought to be sent to the postmaster. If there has been a mistake made in the decision to block the e-mail, this can be resolved with the postmaster and user.

According to another aspect of the present invention, a user may specify that only e-mail from registered sources and from valid contacts are to be accepted while all e-mail from unregistered sources is to be blocked. If a user elects this option, e-mails from unregistered sources are returned to the sources along with instructions on how to register. The appropriate person at the particular source may follow the instructions and register their site for sending e-mail to the particular user. Requiring all sources to register provides the user with greater control over the e-mails they receive and ultimately with influence over the types of e-mails that they receive.

Those skilled in the art understand that computer readable instructions for implementing the above-described processes, such as those described with reference to FIGS. 6 and 7, can be generated and stored on one of a plurality of computer readable media such as a magnetic disk or CD-ROM. Further, a computer such as that described with reference to FIG. 2 may be arranged with other similarly equipped computers in a network, and each computer may be loaded with computer readable instructions for performing the above-described processes. Specifically, referring to FIG. 2, microprocessor 322 may be programmed to operate in accordance with the above-described processes.

While the invention has been described and illustrated with reference to specific embodiments, those skilled in the art will recognize that modification and variations may be made without departing from the principles of the invention as described above and set forth in the following claims. Accordingly, reference should be made to the appended claims as indicating the scope of the invention.

What is claimed is:

1. A method of sorting e-mail, comprising:
    receiving an e-mail from an e-mail source;
    identifying whether the e-mail has a vendor registration code for identifying a vendor from whom the e-mail was forwarded;
    determining a source category of the e-mail by matching the e-mail source to an associated source category from a plurality of source categories, wherein each source category identifies related e-mail sources, the e-mail sources belonging to the same source category related to each other by a shared characteristic other than unwanted e-mail being delivered from the e-mail sources;
    downloading from a database server the plurality of source categories associated with the e-mail sources;
    when the e-mail has a vendor registration code that was previously assigned by a recipient to the e-mail source, presenting the e-mail with other e-mails received from sources having vendor registration codes; and
    when the e-mail does not have a valid vendor registration code, presenting the e-mail grouped together with other e-mails determined to be in the same source category, adding information about vendor registration codes to the e-mail and returning the e-mail to the e-mail source;
    wherein the information about the vendor registration codes includes instructions on how to register to obtain a vendor registration code.

2. The method of claim 1, wherein the step of presenting the e-mail with other e-mails having vendor registration codes further comprises presenting the e-mail with other e-mails having the same vendor registration code and a vendor registration purpose code.

3. The method of claim 1, wherein the step of identifying whether the e-mail has a registration code further comprises identifying the username from which the e-mail was forwarded and the source of the e-mail.

4. The method of claim 3, further comprising:
identifying whether the username and source identify a valid contact; and
when the username and source identify a valid contact, presenting the e-mail with other emails having a username and source identifying a valid contact.

5. The method of claim 1, wherein an e-mail source is determined by a domain associated with the e-mail.

6. The method of claim 1, further comprising updating periodically from a database server the plurality of source categories associated with e-mail sources.

7. A system for sorting e-mails, comprising:
a memory; and
a processor, wherein the processor is operable to:
receive an indication that an e-mail has been received from an e-mail source;
identify whether the e-mail has a vendor registration code for identifying a vendor from whom the e-mail was forwarded;
determine a source category of the e-mail by matching the e-mail source to an associated source category from a plurality of source categories, wherein each source category identifies related e-mail sources, the e-mail sources belonging to the same source category related to each other by a shared characteristic other than unwanted e-mail being delivered from the e-mail sources;
download from a database server the plurality of source categories associated with the e-mail sources;
when the e-mail has a vendor registration code that was previously assigned to the e-mail source, presenting the e-mail with other e-mails that have vendor registration codes; and
when the e-mail does not have a valid vendor registration code, presenting the e-mail together with other e-mails determined to be in the same source category, adding information about vendor registration codes to the e-mail and returning the e-mail to the e-mail source;
wherein the information about the vendor registration codes includes instructions on how to register to obtain a vendor registration code.

8. A computer readable storage medium having computer executable instructions stored thereon for performing a method of sorting e-mails, the method comprising:
receiving an e-mail from an e-mail source;
identifying whether the e-mail has a vendor registration code for identifying a vendor from whom the e-mail was forwarded;
determining a source category of the e-mail by matching the e-mail source to an associated source category from a plurality of source categories, wherein each source category identifies related e-mail sources, the e-mail sources belonging to the same source category related to each other by a shared characteristic other than unwanted e-mail being delivered from the e-mail sources;
when the e-mail has a vendor registration code that was previously assigned to the e-mail source, presenting the e-mail with other e-mails received from sources having vendor registration codes; and
when the e-mail does not have a valid vendor registration code, presenting the e-mail together with other e-mails determined to be in the same source category, adding information about vendor registration codes to the e-mail and returning the e-mail to the e-mail source;
wherein the information about the vendor registration codes includes instructions on how to register to obtain a vendor registration code.

9. The computer readable storage medium of claim 8, further comprising parsing the e-mail to identify at least one of the following: a username from whom the e-mail was forwarded; and a source from which the e-mail was forwarded.

* * * * *